April 24, 1928.
E. F. W. ALEXANDERSON
1,667,647
ELECTRIC MOTOR
Filed March 11, 1925   2 Sheets-Sheet 1
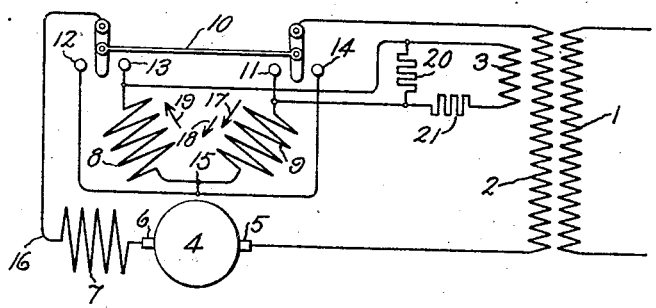
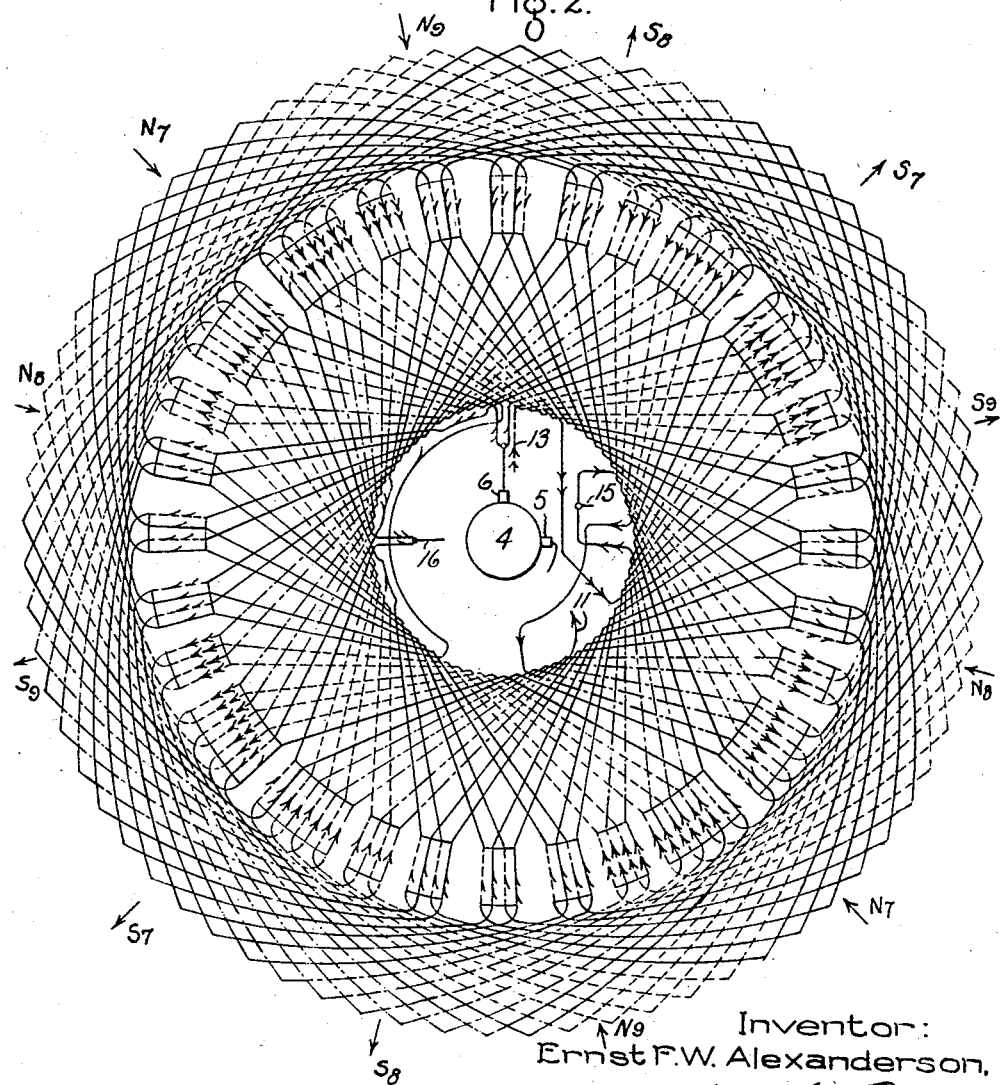
Inventor:
Ernst F.W. Alexanderson,
by *Alexander S. Lantz*
His Attorney.

April 24, 1928.

E. F. W. ALEXANDERSON

ELECTRIC MOTOR

Filed March 11, 1925    2 Sheets-Sheet 2

1,667,647

Inventor:
Ernst F. W. Alexanderson,
by Alexander S. Lunte
His Attorney.

Patented Apr. 24, 1928.

1,667,647

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC MOTOR.

Application filed March 11, 1925. Serial No. 14,822.

My invention relates to electric motors, and has for its object the provision of an improved reversible motor wherein the same coils are utilized to produce both the exciting and commutating motor field fluxes.

It is desirable that an alternating current motor be provided with an exciting field winding for producing the working flux of the motor, a compensating field winding distributed over the field core in a manner to permit neutralization of the motor armature reaction, and a commutating field winding arranged to produce field flux of a phase and value suitable for good commutation. The arrangement of these three field windings on the field core involves certain difficulties for the reason that, from a theoretical view point, they should occupy the same space. This difficulty is not confined to any single type of winding nor to any particular form of winding coil. In accordance with my invention, this difficulty is largely avoided by arranging the exciting field coils to permit their utilization for the purpose of producing the commutating field flux of the motor.

My invention will be better understood from the following description when considered in connection with the accompanying drawing and its scope will be pointed out in the appended claims.

Figure 3:
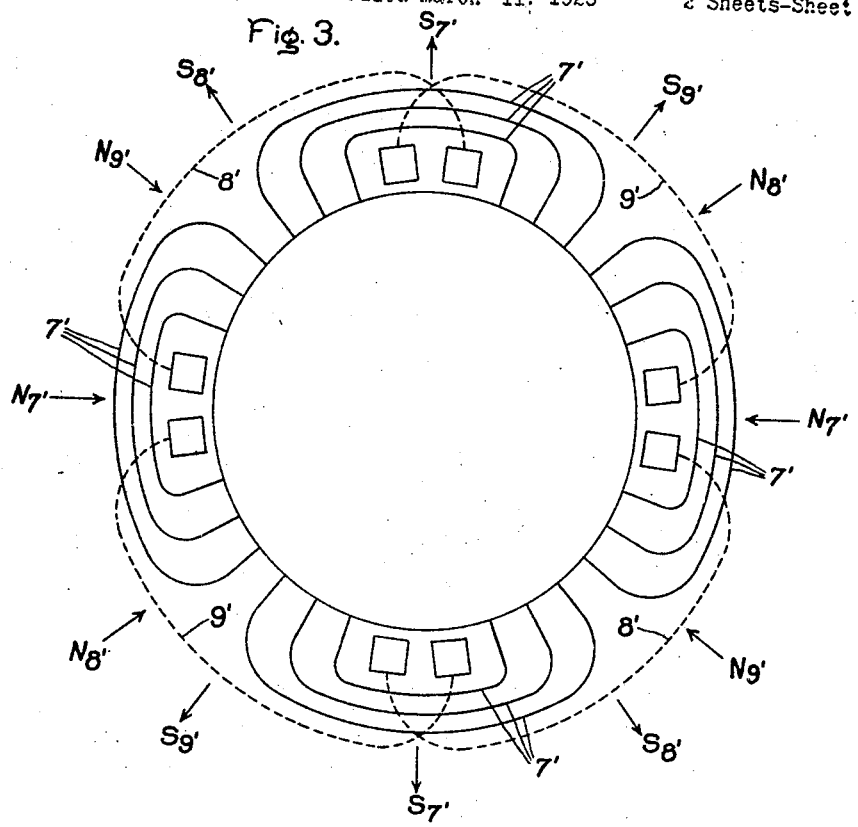
Figure 4:
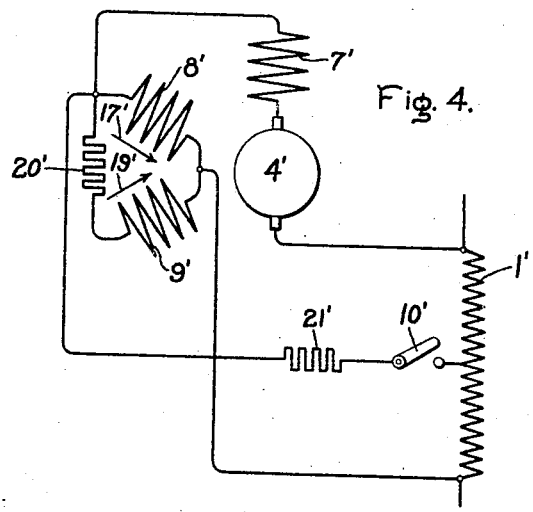

Referring to the drawing, Fig. 1 shows a motor control system in which my invention has been embodied; Fig. 2 shows my invention as applied to a winding having similar end turns and hereinafter designated as a barrel type winding; Fig. 3 shows my invention as applied to a winding composed of non-uniform coils and hereinafter designated as a basket type winding; and Fig. 4 shows a modified system of speed control in which my invention has been embodied.

A winding composed of uniform coils having similar end turns is commonly known as a barrel winding. In the construction of dynamo electric machines, it is sometimes desirable to use a barrel winding for the reason that the coils are of uniform size and may be wound on the same form. Heretofore, the necessity of producing a strong commutating field has precluded the use of a barrel winding in reversible alternating current motors of the commutator type. In accordance with my invention, the use of uniform coils is rendered possible by an arrangement wherein the separate exciting field windings for driving the motor in opposite directions are together utilized to produce the commutating field of the motor.

Fig. 1 shows a motor control system wherein a source, shown as a transformer, comprising a primary winding 1, a secondary winding 2 and a tertiary winding 3, is arranged to supply current for energizing a motor provided with an armature winding 4, armature brushes 5 and 6, compensating winding 7 and exciting windings 8 and 9 which are arranged to produce fields in opposite directions. A double throw switch 10 is provided for controlling the connections of the motor to the transformer.

Fig. 2 shows the arrangement of the motor field coils and the manner of their interconnection. The compensating field winding 7 in this figure is shown as made up of two parts connected in parallel. When the blades of the switch 10 are brought into engagement with the contacts 13 and 14, the exciting winding 8 and the compensating winding 7 are energized. At a given instant, the direction of current flow in the field conductors of the winding 8 may be indicated by the double arrow heads. At the same instant the direction of current flow in the two halves of the compensating winding may be indicated by the single and double half arrow heads. With these connections compensating field poles will be produced as indicated by the arrows $N_7$ and $S_7$, exciting field poles will be produced as indicated by the arrows $N_8$ and $S_8$ and the motor will be driven in a direction determined by this direction of the exciting flux.

When the blades of the switch 10 are moved into engagement with the contacts 11 and 12, the windings 7 and 9 are energized. Assuming that the direction in which current is supplied to the motor has not changed, the direction of the current in the two parts of the compensating winding 7 will be the same as when the switch blades are in engagement with contacts 13 and 14 and the arrangement of the compensating field poles will be unaltered. The direction of current transmission in the winding 9 under these conditions is indicated by the single arrow heads and the exciting poles produced by the winding are indicated by the arrows $N_9$ and $S_9$. It will be observed that the exciting windings 8 and 9 thus produce exciting fields which are almost in opposite directions but are angularly displaced from each other to a slight extent. It will be readily understood that the direction of motor rotation is determined by the direction of its exciting field, and that the motor will rotate in one direction when the winding 8 is energized and in the opposite direction when the winding 9 is energized.

The angular displacement of the exciting windings 8 and 9 with respect to each other makes it possible for these windings to perform the double function of producing both the exciting and commutating flux required by the motor. For the purpose of explaining how the commutating flux of the motor is produced, it will be assumed that the blades of the switch 10 are in engagement with the contacts 11 and 12. Under these conditions, the flux produced by the winding 9 may be represented by the arrow 17 which has one component in the exciting axis of the motor and another component in the commutating axis of the motor. Since the winding 9 is connected in series with the motor armature winding, the commutating component flux produced by this winding will be proportional in value to the motor load. This component compensating flux, however, may not be of a value suitable for producing good commutation under all conditions of operation. In order to produce the proper resultant commutating field under all conditions of operation, the exciting windings 8 and 9 are connected in series to the tertiary winding 3. The flux produced by reason of this connection may be represented by the arrows 18 and 19. The exciting axis components of this flux cancel and its compensating axis components are additive. The total or resultant commutating flux is therefore proportional not only to the motor load current, but also to the tertiary winding voltage which may be so chosen as to insure the production of the necessary commutating flux. It will be readily understood that means other than the tertiary winding 3 may be utilized to control the commutating flux of windings 8 and 9.

Resistors 20 and 21 are connected to the tertiary winding 3 in parallel and series respectively with the exciting windings for the purpose of controlling the phase relation between the tertiary voltage and the current which the tertiary supplies to the exciting windings 8 and 9. If the commutating component flux produced in the winding 9 by the load current is in phase with the flux produced in the windings 8 and 9 by reason of their connection to the tertiary winding 3, these fluxes will, of course, reach their maximum value at the same instant and a resultant commutating flux of a given value will be produced. If these two fluxes are not in phase, the maximum value of the commutating flux will be somewhat reduced. The actual strength of the commutating field at any instant is thus determined by a number of factors which may be independently chosen to insure a sufficiently strong commutating field under all conditions of service and this result is accomplished by the use of a field winding composed of uniform coils.

In Fig. 3, the motor field windings are shown as comprising compensating coils 7' and oppositely wound exciting windings 8' and 9'. The various details of this winding will be readily understood. It differs from the barrel type of winding in that its end turns are not uniform and differs from the previous types of basket winding in that the exciting coils 8' and 9' are angularly displaced to permit their utilization for the purpose of producing the motor commutating field, thus avoiding the necessity of providing a separate winding for this purpose and facilitating the disposition of the windings upon the field core. The field windings 7', 8' and 9' may be energized in the same manner as the windings 7, 8 and 9 of Figs. 1 and 2, or may be energized in any other suitable manner.

A modified arrangement for controlling the energization of the field windings is shown by Fig. 4 wherein the motor is connected to have its exciting field produced through the winding 8'. With the connections as shown in this figure, current is supplied from a source, shown as an auto-transformer 1', which is connected in series with the armature winding 4', compensating winding 7' and exciting winding 8'. It will be observed that a resistor 20' and the exciting winding 9' are connected in parallel to the exciting winding. With these connections, the flux of the winding 8' may be represented by the arrow 17' and that of the winding 9' may be represented by the arrow 19'. As will be readily understood from the explanation of Fig. 1, the flux represented by the arrow 17' has a commutating field component that is proportional in value to the motor load; the flux represented by the arrow 19' has a commutating field component that has its phase and value determined by the resistor 20'; and the total commutating field is determined by factors which may be independently regulated to ensure the proper value of commutating flux under different conditions of service. Greater flexibility in the control of the commutating field flux may be obtained by use of the resistor 21' and the switch 10' which are arranged to impress an auxiliary electromotive force on the windings 8' and 9' and resistor 20' for the purpose of producing additional variations in the commutating flux of the motor. Reversal of the motor may be produced by disconnecting the compensating field winding 7' and resistor 21' from the terminal of the exciting field winding 8' and connecting them to the terminal of the exciting field winding 9'.

The embodiments of the invention illustrated and described herein have been selected for the purpose of clearly setting forth the principles involved. It will be apparent, however, that the invention is susceptible of being modified in many ways to meet the different conditions encountered in its use and I therefore aim to cover by the appended claims all modifications within the true spirit and scope of my invention.

What I claim as new and desire to secure by Letters Patent of the United States, is:

1. An electric motor comprising an armature winding provided with a commutator and a field winding characterized by the fact that said field winding includes a group of parallel connected coils arranged to be connected in series with said armature winding for producing the compensating field of said motor, a second group of coils arranged to be connected in series with said armature and compensating windings to produce an exciting field for driving said motor in one direction, and a third group of coils angularly displaced from said second group of coils and arranged to be connected in series with said armature and compensating windings to produce an exciting field for driving said motor in the opposite direction all of said coils having uniform end connections.

2. An electric motor comprising an armature winding provided with a commutator, and a field winding of the barrel type comprising parallel connected compensating coils, a group of coils arranged to be connected in series with said armature winding to produce an exciting field for driving said motor in one direction and a second group of coils angularly displaced from said first mentioned group of coils and arranged to be connected in series with said armature winding to produce an exciting field for driving said motor in the opposite direction.

3. An electric motor comprising an armature winding provided with a commutator and a field winding comprising angularly displaced groups of exciting field coils for driving said motor in opposite directions, means for supplying current to one of said groups to produce the motor exciting flux and a part of the motor commutating flux, means for supplying current to both of said groups to produce the remainder of said motor commutating flux and a compensating field winding comprising parallel connected coils connected in series with said armature, all of said field coils making up a barrel winding.

4. An electric motor comprising an armature winding provided with a commutator and a barrel field winding comprising parallel connected compensating coils and angularly displaced groups of exciting field coils for driving said motor in opposite directions, means for supplying current to one of said groups to produce the motor exciting flux and a component of the motor commutating flux which is proportional to the load of said motor, and means for supplying current to both of said groups to produce a component of said motor commutating flux which is independent of the load of said motor.

5. An electric motor comprising an armature winding provided with a commutator and a barrel field winding comprising parallel connected compensating coils and angularly displaced groups of exciting field coils for driving said motor in opposite directions, means comprising a transformer secondary winding for supplying current to one of said groups to produce the motor exciting flux and a part of the motor commutating flux, and means comprising a transformer tertiary winding for supplying current to both of said groups to produce the remainder of said commutating flux.

6. An electric motor comprising an armature winding provided with a commutator and a field winding including angularly displaced groups of exciting field coils for driving said motor in opposite directions, means for supplying current to one of said groups to produce the motor exciting flux and a part of the motor commutating flux, means for supplying current to both of said groups to produce the remainder of said commutating flux, and resistors connected in series and parallel with said groups for modifying the phase of the current supplied thereto from said tertiary winding.

7. An alternating current motor comprising an armature winding provided with a commutator and a barrel field winding, said field winding having parallel connected compensating coils connected in series with said armature winding and groups of exciting coils arranged to be selectively connected in series with said armature winding to produce field excitation for driving said motor in opposite directions, said groups of exciting coils being angularly displaced with respect to each other whereby each group of exciting coils produces a commutating flux in the same direction for each direction of operation of the motor.

In witness whereof, I have hereunto set my hand this 10th day of March, 1925.

ERNST F. W. ALEXANDERSON.